United States Patent [19]
Daniels et al.

[11] 3,720,727
[45] March 13, 1973

[54] PURIFICATION OF ACETYLENICALLY UNSATURATED HYDROCARBONS

[75] Inventors: Calvin L. Daniels, James M. Watson, both of Big Spring, Tex.

[73] Assignee: Cosden Oil & Chemical Company, Big Spring, Tex.

[22] Filed: Dec. 22, 1971

[21] Appl. No.: 211,064

[52] U.S. Cl. .................................. 260/674 R, 203/29
[51] Int. Cl. ................................................ C07c 7/02
[58] Field of Search ..................... 260/674 R; 203/29

[56] References Cited

UNITED STATES PATENTS

| | | | |
|---|---|---|---|
| 3,303,229 | 2/1967 | de Rosset | 260/668 |
| 3,542,888 | 11/1970 | d'Ostrowick et al. | 260/668 |
| 3,594,423 | 7/1971 | Relles | 260/668 |
| 3,594,437 | 7/1971 | White | 260/674 |

Primary Examiner—Delbert E. Gantz
Assistant Examiner—C. E. Spresser
Attorney—M. N. Cheairs et al.

[57] ABSTRACT

A process for the separation of acetylenically unsaturated aromatic hydrocarbons from mixtures containing such hydrocarbons in admixture with vinyl substituted aromatic hydrocarbons, said process comprising contacting said mixture with a halogen selected from the group consisting of bromine, chlorine and mixtures thereof, under halogenation conditions, said halogen being present in an amount such as to halogenate the vinyl substituents of said vinyl substituted aromatic hydrocarbons, and thereafter separating and recovering said acetylenically unsaturated aromatic hydrocarbons.

9 Claims, No Drawings

PURIFICATION OF ACETYLENICALLY UNSATURATED HYDROCARBONS

BACKGROUND OF THE INVENTION

The present invention relates to the purification of acetylenically unsaturated hydrocarbons. More particularly, the present invention relates to the separation and purification of aromatic hydrocarbons having acetylenically unsaturated substituents, i. e., diethynylbenzenes.

The separation and purification of acetylenically unsaturated hydrocarbons such as diethynylbenzenes from close boiling impurities has become of significant importance. Diethynylbenzenes are members of a broad class of diethynyl compounds useful as starting materials for preparing polymeric acetylenes which polymeric acetylenes are soluble and are greater than 90 percent carbon. However, in the preparation of diethynylbenzenes, by-products are formed by side reactions which by-products are difficult to remove from the desired diethylnylbenzenes. Generally, these impurities have only one ethynyl group rather than the desired two ethynyl groups and therefore are deleterious to the formation of the acetylenic polymer since they act as chain stoppers, seriously reducing the molecular weight of the polymer which can be obtained from the diethynylbenzenes.

The general techniques, such as for instance fractional distillation or recrystallization, frequently are not sufficiently effective to produce the desired purity of diethynylbenzenes. For example, employing the best known procedures for purification including purification of intermediate products of the diethynylbenzene synthesis, the final product will still generally contain only 95 to 98 percent of the desired diethynylbenzene with the remainder being primarily vinylethynylbenzenes and ethynylethylbenzenes. Even in the 98 percent material, these impurities limit the average degree of polymerization to about 90, i. e., the average number of repeating units in the polymer molecule is 90.

It is now an object of the present invention to provide a new and improved process for the separation and purification of acetylenically unsaturated hydrocarbons.

Another object of the present invention is to provide a new and improved process for the separation and purification of diethynylbenzenes.

Still another object of the present invention is to provide a new and improved process for the separation of diethynylbenzenes from close boiling, difficulty separable aromatic hydrocarbons containing vinyl substituents.

Additional objects will become apparent from the following description of the invention herein disclosed.

SUMMARY OF THE INVENTION

The present invention, which fulfills these and other objects, is a process for the separation of acetylenically unsaturated aromatic hydrocarbons from mixtures containing such hydrocarbons in admixture with vinyl substituted aromatic hydrocarbons, said process comprising contacting said mixture with a halogen selected from the group consisting of bromine, chlorine and mixtures thereof, under halogenation conditions, said halogen being present in an amount such as to halogenate the vinyl substituents of said vinyl substituted aromatic hydrocarbons, and thereafter separating and recovering said acetylenically unsaturated aromatic hydrocarbons.

By means of the present invention, the acetylenically unsaturated aromatic hydrocarbons, i.e., diethynylbenzenes, may be readily obtained in a purity of greater than 99 percent.

DESCRIPTION OF THE PREFERRED EMBODIMENT OF THE PRESENT INVENTION

The present invention is applicable to the separation and removal of vinyl substituted aromatic hydrocarbons from admixture with aromatic hydrocarbons having acetylenic unsaturation. In its most useful application, however, the present invention is utilized in the separation and purification of ethynylbenzenes, i.e., ethynylbenzene, diethynylbenzenes, from admixture with such vinyl substituted benzenes as vinylbenzenes, vinylethynylbenzenes and other benzenes having vinyl substituents. The diethynylbenzenes separated and purified in accordance with the present invention include the meta-, para- or ortho- diethynylbenzene or mixtures thereof.

In effecting the separation and purification of the acetylenically unsaturated aromatic hydrocarbons such as diethynylbenzenes, in accordance with the present invention, the mixture containing such hydrocarbons is contacted with a halogen which generally, is either bromine or chlorine or a mixture thereof. The amount of halogen employed generally is approximately a stoichemetric amount with respect to the vinyl substituents of the vinyl substituted impurities in the mixture from which the acetylenically unsaturated aromatic hydrocarbon is to be separated. However, in order to obtain relatively complete purification of the acetylenically unsaturated hydrocarbon, i.e., diethynylbenzenes, it usually is desirable to employ a molar excess of halogen such as 0.5 to 5.0 moles, preferably 1.0 to 2.5 moles, of halogen per vinyl substituent present in the mixture. The use of too large an excess will result in loss of a portion of acetylenically unsaturated aromatic hydrocarbons while the use of too low an amount of halogen will result in incomplete purification of such acetylenically unsaturated aromatic hydrocarbon.

The halogen is usually employed in connection with an inert solvent or dispersing medium. Such solvent may be virtually any compound inert to the reaction and which is liquid at the reaction temperatures hereinafter discussed. Also, obviously such solvent should not be one which itself would be difficult to separate from the final desired products and which will remain liquid at the low temperatures hereafter discussed. Particularly useful are such solvents as halohydrocarbons, i.e., chloroform, iodoform, chloroethane, carbon tetrachloride, dichloromethane, carbon tetraiodide, diiodomethane, etc.; hydrocarbons as n-hexane, cyclohexane, benezene, toluene, etc.; alcohols as methanol, ethanol, etc.; N,N-dialkylamides, i.e., N,N-dimethylformamide, and the like. The preferred solvents are chloroform, carbon tetrachloride, dichloromethane, benzene, n-hexane, and methanol.

The amount of the above mentioned solvent employed may vary over a wide range. Generally, it need only be an amount adequate for absorbing or dispersing the halogen and the acetylenically unsaturated aromatic hydrocarbon containing mixture to be separated. Such amount, employing the most useful solvents, will usually be within the range of 1 to 100 volumes per volume of halogen though both higher and lower amounts may be used if desired.

The halogen may be initially dissolved in the solvent and the resulting solution contacted with the mixture to be separated. Alternatively, however, none or only a part of the halogen may be initially dissolved in the solvent with all or part thereof then being added continuously or intermittently into the reaction solution. In such instance, the halogen may be bubbled through the reaction mass. Most often, whether the halogen is initially all in solution with the solvent or added continuously or intermittently, the halogen is added slowly into contact with the mixture to be separated, with continuous agitation of the reaction mass.

In accordance with the present invention, the halogen is contacted with the mixture to be separated at a temperature of $-75°$ to $50°$ C, preferably $-50°$ to $25°$ C. Pressures are not critical with the present invention and generally are autogenous in the contacting zone. Usually, the contact of the halogen with the mixture to be separated is carried out over a period of 0.005 to 10 hours, preferably 0.01 to 4 hours.

After completion of the halogenation reaction, the reaction mass is subjected to distillation. From such distillation, the acetylenically unsaturated aromatic hydrocarbons are taken overhead. Generally, this distillation is carried out at reduced pressures such as for example, below 200 mm Hg. Preferably, however, particularly when separating and recovering diethynylbenzenes, the distillation is carried out at a pressure within the range of 1 to 50 mm Hg. At these pressures, bottom temperatures within the range of 50 to 150° C are usually employed to provide adequate boil-up of the acetylenically unsaturated aromatic hydrocarbons. Most often, this distillation may be accomplished with relatively simple distillation equipment, seldom requiring more than 20 distillation stages to obtain a 99+ percent purity of acetylenically unsaturated aromatic hydrocarbon in the overhead.

In order to further describe and to specifically illustrate the present invention, the following examples are presented. These examples are not to be construed as limiting of the present invention.

EXAMPLE 1

To a 100 ml., 3 necked flask equipped with a magnetic stirrer, dropping funnel and thermometer, were added 50 grams of diethylbenzene having the composition set forth in Table 1 below. The diethynylbenzene was cooled to $-5°$ C to $0°$ C and a solution of 1 ml. of bromine and 20 mls. of chloroform was slowly introduced. After the addition was complete, the mixture was maintained at $0°$ C for about four hours with stirring throughout. The product was then subjected to vacuum distillation at a pressure of 10 mm Hg with a bottoms temperature of 65° to 70° C. Diethynylbenzene was obtained as an overhead product. Upon analysis, this overhead product was found to have the composition set forth in the following Table I.

TABLE I

| Component | Diethynylbenzene Feed, Wt.% | Diethynylbenzene Product, Wt.% |
|---|---|---|
| alkyl and vinylethynylbenzenes | 2.04 | 0.55 |
| p-diethynylbenzene | 4.05 | 3.14 |
| m-diethynylbenzene | 81.06 | 96.12 |
| Unidentified | 12.85 | 0.20 |

EXAMPLE 2

The procedure of Example 1 was substantially repeated with the exception that a different diethynylbenzene feed was treated. The composition of this diethynylbenzene feed and the resulting product are set forth in the following Table II.

TABLE II

| Component | Diethynylbenzene Feed, Wt.% | Diethynylbenzene Product, Wt.% |
|---|---|---|
| alkyl & vinylethynylbenzenes | 1.78 | 0.61 |
| p-diethynylbenzene | 2.72 | 2.77 |
| m-diethynylbenzene | 91.77 | 96.30 |
| Unidentified | 3.72 | 0.32 |

EXAMPLE 3

Example 1 was again substantially repeated with the exception that chlorine was used in place of bromine in an amount of 0.05 moles of chlorine per mole of diethynylbenzene. Also, a different diethynylbenzene feed was treated. The composition of the diethynylbenzene feed and the resulting product are presented in the following Table III.

TABLE III

| Component | Diethynylbenzene Feed, Wt.% | Diethynylbenzene Product, Wt.% |
|---|---|---|
| alkyl & vinylethynylbenzenes | 0.88 | 0.53 |
| p-diethynylbenzene | 2.78 | 3.04 |
| m-diethynylbenzene | 93.10 | 95.05 |
| Unidentified | 2.33 | 1.15 |

From each of the above examples, it is readily noted that the diethynylbenzene may be substantially purified by the process of the present invention. Particularly, in Examples 1 and 2, the diethynylbenzene was taken to a 99+ percent purity. It would also be noted from the examples, that the present invention is somewhat selective to the recovery of the meta-diethynylbenzene.

EXAMPLE IV

Five grams of an impure diethynylbenzene fraction containing 96.5 wt. percent m-diethynylbenzene, 2.2 wt. percent m-vinylethynylbenzene, 0.2 wt. percent m-ethyl ethynylbenzene and 1.1 wt. percent diethylbenzenes and unidentified impurities, were placed in a round bottom flask and diluted with approximately 15 grams of $CCl_4$. The resulting mixture was cooled to $-30°C$ with stirring. Chlorine gas was then intermittently bubbled through the mixture in increments of 0.1 gram (approximately 5 mol percent as related to the diethynylbenzene in the mixture). Samples were taken at 5, 10, 15 and 20 mol percent chlorine additions. Upon vacuum distillation of each of the samples at about 5 mm Hg, a lighter overhead fraction is first obtained containing the diethylbenzenes and any other light components and a second or heavier diethynylbenzene fraction is then obtained. The diethynylbenzene fractions having the compositions set forth in Table IV below are obtained.

TABLE IV

| Component | Wt.% concentration from chlorine levels of | | | |
|---|---|---|---|---|
| | 5 mol % | 10 mol % | 15 mol % | 20 mol % |
| m-diethynylbenzene | 99.70 | 99.70 | 99.60 | 100.0 |
| m-vinylethynylbenzene | trace | trace | | |
| m-ethylethynylbenzene | 0.3 | 0.3 | .40 | |

EXAMPLE 5

Fifty grams of a crude diethynylbenzene fraction having the composition set forth in Table V below was diluted with 75 ml. of CCl$_4$ and cooled to and maintained at −40° ± 10° C. Chlorine was added in increments of 5 mol percent up to a total of 25 mol percent chlorine, based on diethynylbenzene in the fraction. Samples were collected after each of the incremental additions of chlorine. Each sample is distilled at approximately 5 mm Hg. to produce a first overhead fraction containing C$_9$ aromatics, diethylbenzene and other materials boiling below the diethynylbenzene and a second overhead fraction comprising C$_{10}$ hydrocarbons boiling close to the diethynylbenzenes. The composition of each of these incremental samples is presented in Table V below.

TABLE V

| Component | Feed Wt% | Wt.% concentration of chlorine total additions (mol %) | | | | |
|---|---|---|---|---|---|---|
| | | 5 | 10 | 15 | 20 | 25 |
| C$_9$ aromatics | 5.5 | | | | | |
| diethylbenzenes | 1.8 | | | | | |
| C$_{10}$ aromatics | 0.6 | | | | | |
| m-, p-ethyl ethynylbenzenes | 5.8 | | | | | |
| divinylbenzenes | 6.1 | | | | | |
| m-, p-vinyl ethynylbenzenes | 3.9 | 4.6 | 1.6 | 0.25 | | |
| m-diethynylbenzene | 67.7 | 89.8 | 92.8 | 94.0 | 94.6 | 95.1 |
| p-diethynylbenzene | 4.4 | 5.7 | 5.7 | 5.75 | 5.4 | 5.0 |
| naphthalene | 1.6 | | | | | |

What is claimed is:

1. A process for the separation of acetylenically unsaturated aromatic hydrocarbons from mixtures containing such hydrocarbons in admixture with vinyl substituted aromatic hydrocarbons, said process comprising contacting said mixture with a halogen selected from the group consisting of bromine, chlorine and mixtures thereof, under halogenation conditions, said halogen being present in an amount such as to halogenate the vinyl substituents of said vinyl substituted aromatic hydrocarbons, and thereafter separating and recovering said acetylenically unsaturated aromatic hydrocarbons.

2. The process of claim 1 wherein said acetylenically unsaturated aromatic hydrocarbon is diethynylbenzene.

3. The process of claim 1 wherein said acetylenically unsaturated aromatic hydrocarbon is phenylacetylene.

4. The process of claim 1 wherein said halogen is bromine.

5. The process of claim 1 wherein said halogen is chlorine.

6. The process of claim 1 wherein said halogen is employed in an amount of 0.5 to 5.0 moles of halogen per vinyl substituent in said mixture.

7. The process of claim 1 wherein said mixture is contacted with said halogen at a temperature of −75° to 50° C.

8. The process of claim 1 wherein said mixture is contacted with said halogen in an inert solvent.

9. The process of claim 8 wherein said inert solvent is selected from the group consisting of hydrocarbons, halohydrocarbons, alcohols and N,N-dialkylamides.

* * * * *